H. E. ASBURY.
KNIFE FOR CHOPPING MACHINES.
APPLICATION FILED DEC. 30, 1911.
1,097,505.
Patented May 19, 1914.
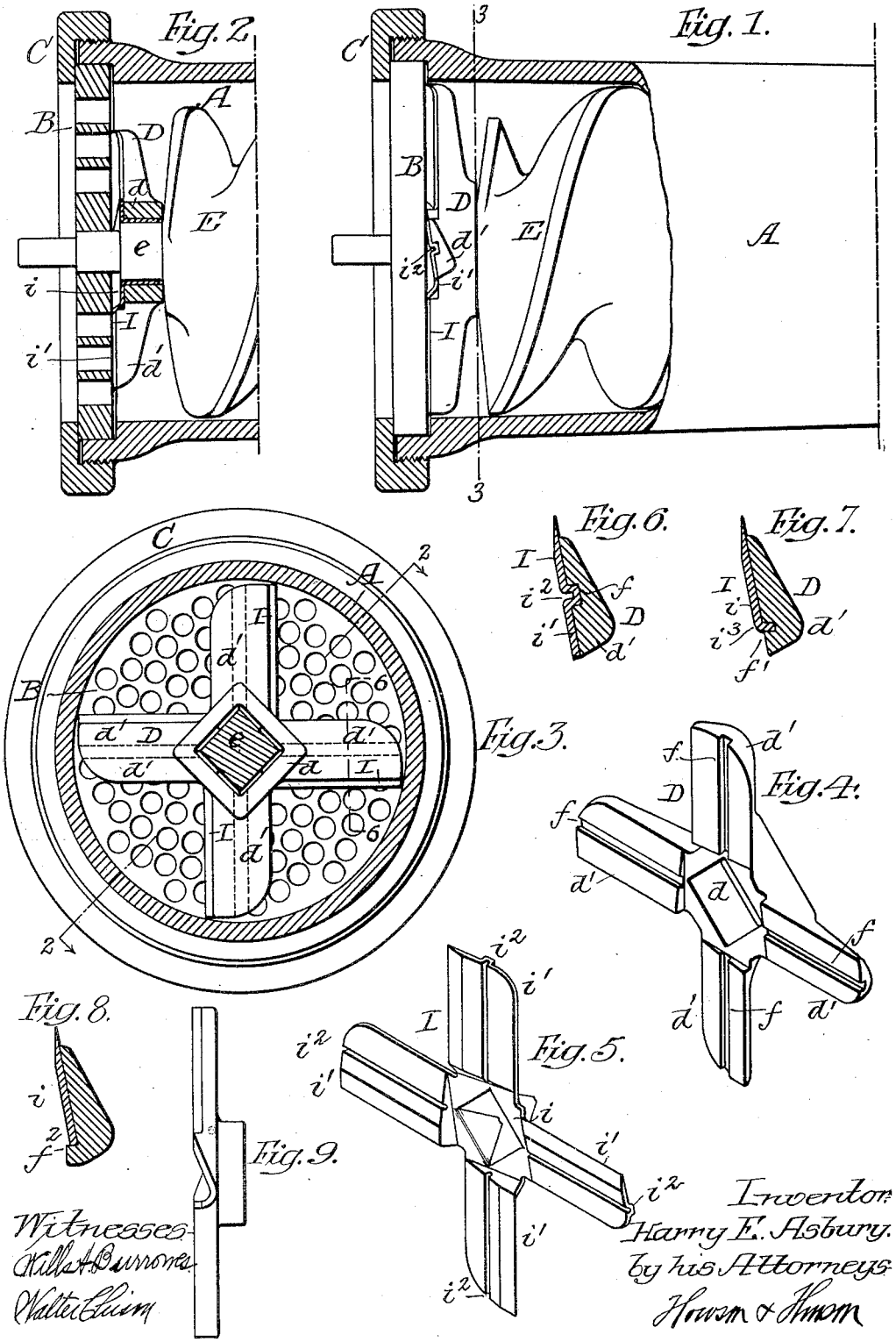

UNITED STATES PATENT OFFICE.

HARRY E. ASBURY, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

KNIFE FOR CHOPPING-MACHINES.

1,097,505.  Specification of Letters Patent.  Patented May 19, 1914.

Application filed December 30, 1911. Serial No. 668,669.

*To all whom it may concern:*

Be it known that I, HARRY E. ASBURY, a citizen of the United States, residing in Philadelphia, Pennsylvania, have invented certain Improvements in Knives for Chopping-Machines, of which the following is a specification.

My invention relates to certain improvements in chopping machines, in which a knife rotates against a perforated plate.

One object of my invention is to make a flexible knife which will accommodate itself to the plate and a further object is to make the knife of comparatively thin material and to support it by a carrier.

Heretofore the knife blade was made solid and had to be very carefully ground in order to properly cut against the plate, and when the knife would wear away it was discarded and a new knife prepared and preferably ground to fit the plate in order to obtain the best results.

By my invention I provide a thin, sheet steel knife, which is supported by a suitable carrier, so that the blade can be discarded when dull and a new blade substituted for it, the blades being carried in stock and any of the blades being interchangeable with the carrier.

In the accompanying drawings: Figure 1 is a side view of a chopping machine illustrating my invention, the casing being in section; Fig. 2 is a sectional view on the line 2—2 Fig. 3; Fig. 3 is a sectional perspective view on the line 3—3 Fig. 1; Fig. 4 is a detached perspective view of the carrier for the blade; Fig. 5 is a detached perspective view of the thin blade; Fig. 6 is an enlarged sectional view of the knife and carrier on the line 6—6 Fig. 3; Figs. 7 and 8 are views illustrating modifications of the invention; and Fig. 9 is a view showing a flexible knife to be used without the carrier.

A is the casing of a chopping machine; B is a perforated plate held to the end of the casing by a screw-threaded ring C, or other fastening; E is a screw having a square shank $e$ adapted to fit the squared opening in the hub $d$ in the knife carrier D. This knife carrier is made as clearly shown in Fig. 4, and has four arms $d'$, and in each of these arms is a longitudinal slot $f$.

I is a knife blade having a hub portion $i$ and projecting arms $i'$, which are so proportioned as to fit snugly against the arms of the carrier D. The knife edge projects sufficiently beyond the edge of the carrier arms so as to properly cut against the perforated plate B.

$i^2$ are ribs at the back of each of the arms $i'$, which, when the blade is fitted against the carrier D, rest in the grooves $f$ in the arms $d'$, as clearly shown in Fig. 6, so as to insure the blade turning with the carrier, and to relieve the hub portion of the blade from strain.

In Figs. 5 and 6, I have shown the rib $i^2$ struck up from the middle of the arm $i'$, but in Fig. 7 the edge $i^3$ of the arms is bent at right angles to the blade and enters the groove $f'$ in the carrier. In place of making the blade with a rib, each arm may be slightly twisted in the manufacture, and fitted against a shoulder $f^2$ on the blade, as illustrated in Fig. 8. I preferably reinforce the hub $i$ of the blade by utilizing the portion cut from the center; this portion is bent and extends into the opening in the carrier.

By this invention, the blade will travel with the cutter in contact with the perforated plate, and owing to its shape and the means of attaching it to the carrier, it will yield to a certain extent so as to accommodate itself to the surface of the perforated plate thus insuring accurate cutting without expert fitting of the parts which is now essential.

In some classes of cutters, I may dispense with the carrier and make the blade from a single piece of sheet metal, as illustrated in Fig. 9, ribbing the blade to reinforce it where necessary. I preferably make the blade from heavier material than the blade illustrated in Fig. 5, although this will depend considerably upon the character of the work for which the blade is intended.

I claim:—

1. The combination in a chopping machine, of a perforated plate; a carrier having arms back of the plate; means for rotating the carrier; a loose detachable sheet metal blade having arms; cutting edges formed on the arms of the blade and extending beyond the arms of the carrier; and means on the arms of the carrier for engaging the loose detachable blade so that it will rotate with the carrier against the perforated plate.

2. The combination in a chopping machine, of a carrier having grooved arms; with a loose detachable sheet metal blade having ribbed arms, the ribs of the arms entering the grooves of the carrier, the cutting edge of the blade extending beyond the arms of the carrier.

In testimony whereof, I have signed my name to this specification, in the presence of two subscribing witnesses.

HARRY E. ASBURY.

Witnesses:
HENRY HOWSON,
WM. A. BARR.

---

Copies of this patent may be obtained for five cents each, by addressing the "Commissioner of Patents, Washington, D. C."